United States Patent [19]
Lilja et al.

[11] Patent Number: 5,854,551
[45] Date of Patent: Dec. 29, 1998

[54] BATTERY CHARGER WITH LOW STANDBY CURRENT

[75] Inventors: Patrik Lilja, Raleigh; Thomas Joseph Karpus, Apex, both of N.C.

[73] Assignee: Ericsson Inc., Research Triangle Park, N.C.

[21] Appl. No.: 806,995

[22] Filed: Feb. 26, 1997

[51] Int. Cl.$^6$ .................................................. H02J 7/00
[52] U.S. Cl. .................................. 320/163; 320/DIG. 12
[58] Field of Search .................................. 320/165, 162, 320/163, 137, 113, 114, 115, DIG. 12

[56] References Cited

U.S. PATENT DOCUMENTS

| | | | |
|---|---|---|---|
| 4,223,262 | 9/1980 | Ballman | 320/DIG. 12 |
| 4,567,421 | 1/1986 | Dattilo | 320/163 |
| 4,584,514 | 4/1986 | Kaminski | 320/145 |
| 4,680,528 | 7/1987 | Mikami et al. | 320/165 |
| 4,727,306 | 2/1988 | Misak et al. | 320/DIG. 12 |
| 5,291,118 | 3/1994 | Kojima | 320/DIG. 12 |
| 5,530,337 | 6/1996 | Yamamoto | 320/DIG. 12 |
| 5,541,491 | 7/1996 | Yamazaki et al. | 320/145 |
| 5,644,210 | 7/1997 | Hwang | 320/DIG. 12 |

FOREIGN PATENT DOCUMENTS

| | | | |
|---|---|---|---|
| 0222381 | 5/1987 | European Pat. Off. | H02J 7/10 |
| 4429101 | 2/1995 | Germany | H02H 7/18 |
| WO95/15017 | 6/1995 | WIPO | H01M 10/44 |

*Primary Examiner*—Peter S. Wong
*Assistant Examiner*—K. Shin
*Attorney, Agent, or Firm*—David C. Hall

[57] ABSTRACT

An apparatus for charging a battery has a power supply terminal, a controllable power control switch coupled to said power supply terminal, a charging circuit having a charging terminal for connection to a terminal of the battery, and means for opening and closing the power control switch if a battery is disconnected or connected to the charging terminal, respectively. The means for opening and closing the power control switch may include an analog circuit, a digital circuit, a hybrid analog/digital circuit or a mechanical switch. A method of controlling a power control switch of a battery charging system is disclosed, comprising the steps of generating a reference voltage level, sensing the voltage level at the charging terminal, comparing the voltage level at the charging terminal to the reference voltage, and controlling the power control switch in response to the comparison of the reference voltage level and the voltage level at the charging terminal.

23 Claims, 10 Drawing Sheets

BATTERY CHARGER WITH LOW STANDBY CURRENT

BACKGROUND OF THE INVENTION

1. Field of the Invention

The present invention relates generally to battery chargers for portable electronic devices, and in particular to vehicle battery chargers for handheld cellular telephones.

2. Description of the Related Art

Handsfree kits (also known as handsfree adapters) are widely used for operating transportable cellular telephones in vehicles. A handsfree kit permits the driver of a vehicle to talk on a cellular telephone while keeping both hands free to operate the steering wheel and other vehicle controls. Handsfree kits typically incorporate a battery charger to charge the battery of the cellular telephone while the telephone is being used in the vehicle, and also to maintain the charge during use.

The battery charger in a handsfree kit typically includes a constant current source battery charger circuit. Such circuits are well known, reliable and inexpensive. However, they have a drawback in that even when the telephone is not connected to the charger, the known battery charger circuits still draw a small standby current. A typical handsfree kit draws power from the electrical system of the vehicle, which provides a 12 volt DC power source. If the vehicle is not running, this current is drawn from the vehicle battery. The standby current, although small, can discharge the battery significantly over an extended period of time, which can undesirably cause the battery to "die."

Presently, vehicle handsfree kits make no provision to limit the amount of current drawn when a telephone (or battery) is not connected to the charger. As a result, the battery charger circuitry may draw up to several milliamps of current when the vehicle is turned off and no battery is connected to the charger. In response to this problem, a number of automotive companies have begun discussions to require that all vehicle accessories connecting to the vehicle's electrical system draw less than 1 mA of current when the vehicle is turned off.

Some vehicle handsfree kits limit standby current by using switching regulator circuits. Using a switching regulator is not particularly advantageous, however, due to the additional cost associated with such a system and the possibility of inducing noise in the audio signals carried by the handsfree system.

Thus, there is a need in the art for a system for limiting standby current drawn by a vehicle handsfree kit battery charger circuit. The system should be simple, inexpensive and reliable.

SUMMARY OF THE INVENTION

Accordingly, it is an object of the invention to provide a handsfree battery charger circuit which limits standby current draw. It is a further object of the invention to provide a handsfree battery charger circuit which limits standby current draw that is simple, inexpensive and reliable.

The foregoing objects are accomplished in a battery charger system having battery charger circuit means, power control switch means, and switch control logic means for controlling the power control switch means. The switch control logic means is responsive to the output voltage level of the battery charger circuit means. In one embodiment, the switch control logic means includes an analog logic circuit. In another embodiment, the switch control logic means includes a digital logic circuit. In yet another embodiment, the switch control logic means includes a hybrid analog/digital logic circuit.

These and other objects of the invention, together with features and advantages thereof will become apparent from the following detailed specification when read with the accompanying drawings in which like reference numerals refer to like elements.

DETAILED DESCRIPTION OF THE PREFERRED EMBODIMENTS

The present invention will now be described with reference to the accompanying drawings, in which preferred embodiments of the invention are shown. However, this invention may be embodied in many different forms and should not be construed as limited to the specific embodiments shown.

Figure 1:
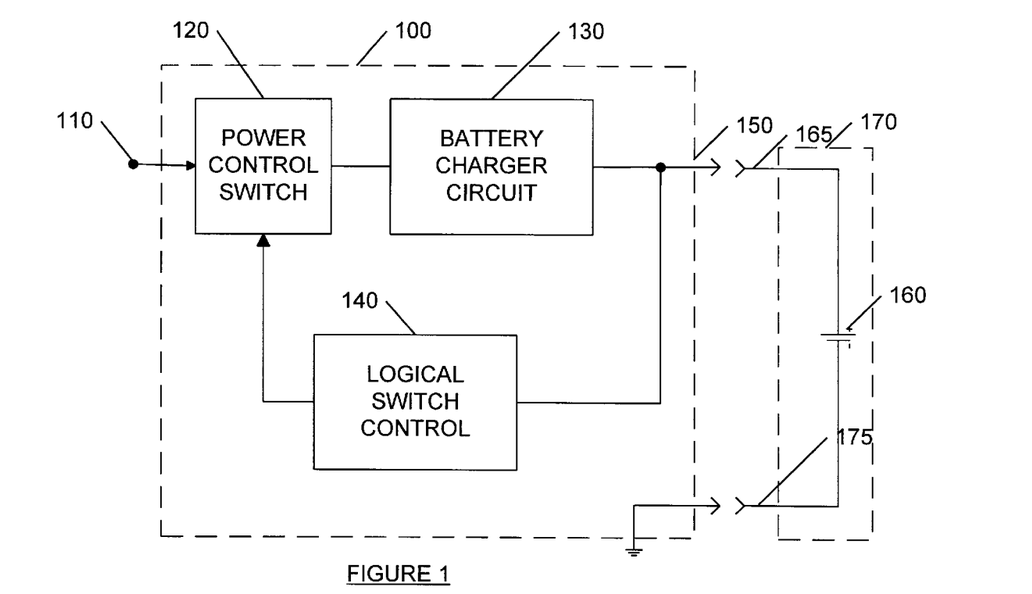
FIG. 1 is a block diagram of an embodiment of the present invention.

Referring now to FIG. 1, a block diagram of an embodiment of the present invention is illustrated as battery charger system 100. Battery charger system 100 includes battery charger circuit 130, which receives power from the vehicle electrical system through terminal 110 and power control switch 120. Power control switch 120 is controlled by a control signal from logical switch control 140.

A battery-powered device 170, which includes at least one rechargeable battery cell 160, may be attached to the battery charger system's charging terminal 150 at battery charging terminal 165 and ground terminal 175. Electrical device 170 may comprise a battery pack or a cellular telephone or other electronic device including a battery pack.

If logical switch control means 140 detects the presence of a battery connected to charger system 100, logical switch control means 140 causes power control switch 120 to close, thereby permitting current to flow to battery charger circuit 130. Alternately, if logical switch control means 140 detects that no battery is connected to charger system 100, logical switch control means 140 causes power control switch 120 to open, thereby preventing current from flowing to battery charger circuit 130.

Figure 2:
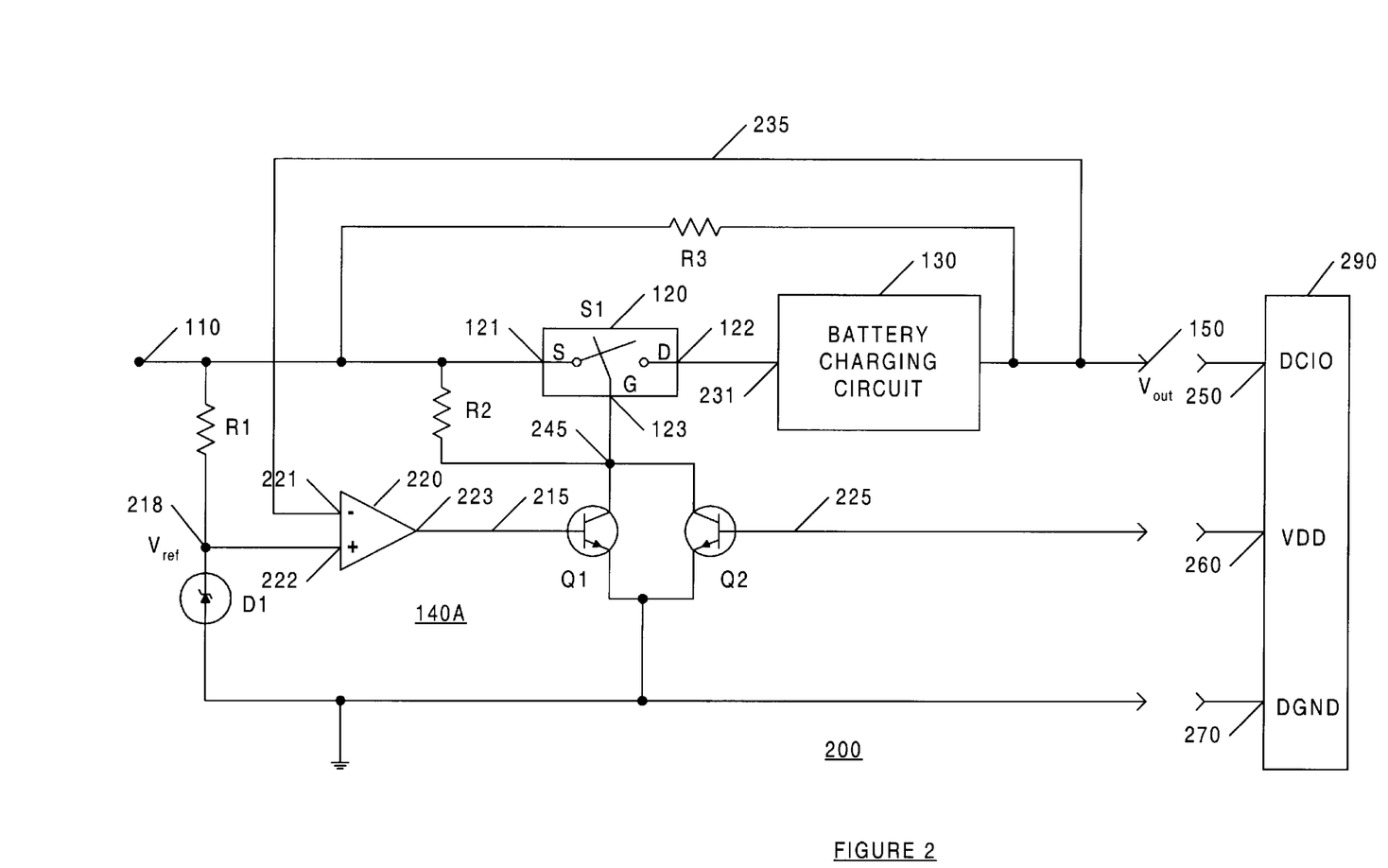
FIG. 2 is a circuit diagram of an embodiment of the present invention including an analog switch control logic circuit.

FIG. 2 illustrates a charging system 200 according to the present invention in which logical switch control means 140 is implemented by means of an analog logic circuit, denoted generally by reference numeral 140A. Logical switch control circuit 140A detects the voltage level (denoted $V_{out}$) at the output of battery charger circuit 130 and opens or closes power control switch 120 in response thereto. A battery powered device (not shown), which may be a cellular telephone such as model AF738 manufactured by Ericsson Inc., may be connected to charger system 200 through a system connector 290 having DCIO, VDD and DGND contacts 250, 260, and 270 representing battery voltage, supply reference voltage and ground contacts, respectively. When the battery powered device is connected to charging system 200, the DCIO contact is coupled to charging terminal 150, and the DGND contact is coupled to the system ground. When the battery powered device is powered on or is otherwise connected to an active battery charger, the battery powered device sets the VDD terminal to a predetermined reference voltage level.

As illustrated in FIG. 2, logical switch control circuit 140A includes a comparator 220 which has an inverting input 221, a noninverting input 222 and an output 223. Comparator 220 may be implemented as a conventional operational amplifier integrated circuit.

The voltage $V_{out}$ at charging terminal 150 is applied to the inverting input 221 of comparator 220 via line 235. A voltage divider comprising resistor R1 and zener diode D1 generates a reference voltage level $V_{ref}$ at node 218, which is applied to the noninverting input 222 of comparator 220. In a preferred embodiment, zener diode D1 has a reverse breakdown voltage of 8.2 V, and resistor R1 has a resistance of 100 kΩ. Terminal 110 is maintained at +12 V by the vehicle's electrical system. Thus, during normal operation, voltage level $V_{ref}$ will be maintained at a stable level of 8.2 V.

Logical switch control circuit 140A also includes a conventional NPN-type transistor Q1 which has base, collector and emitter terminals. Resistor R2, which in a preferred embodiment has a value of 100 kΩ, is coupled between power supply terminal 110 and the collector of transistor Q1. The base of transistor Q1 is coupled to the output of comparator 220, and the emitter of transistor Q1 is coupled to ground.

Logical switch control circuit 140A controls the operation of switch S1 120. In a preferred embodiment, switch 120 is a model Si9400DY three-port switch manufactured by Siliconix. Switch 120 has three terminals: source terminal 121, drain terminal 122 and gate terminal 123. If the voltage at the source terminal 121 exceeds the voltage at the gate terminal 123 by 4 volts or more, switch 120 conducts current between the source terminal 121 and the drain terminal 122. Source terminal 121 of switch 120 is coupled to the power supply terminal 110, the drain terminal 122 is coupled to the input terminal 231 of battery charging circuit 130, and the gate terminal 123 is coupled to the collector of transistor Q1.

When the output of comparator 220 is high, transistor Q1 turns on, lowering the voltage at gate terminal 123 to approximately 0.1 V. This causes switch 120 to conduct, supplying power to charging circuit 130. When the output of comparator 220 is low, transistor Q1 is cut off. The voltage at the gate terminal 123 is pulled high by resistor R2, opening the circuit between the source terminal 121 and the drain terminal 122 of switch 120 and cutting off power to the charging circuit 130.

As noted above, the output voltage of the charging circuit $V_{out}$ is applied to the inverting input 221 of comparator 220, while the reference voltage $V_{ref}$ is applied to the noninverting input 222 of comparator 220. If $V_{out}$ exceeds $V_{ref}$, comparator 220 outputs a low voltage level on control line 215, which causes power control switch 120 to open, cutting off power to battery charging circuit 130. If $V_{out}$ is less than $V_{ref}$, comparator 220 outputs a high voltage level on control line 215, which causes power control switch 120 to close, supplying power to battery charging circuit 130.

Battery charging circuit 130 is a constant current supply charging circuit of conventional design. When power is applied to battery charging circuit 130 via terminal 231, battery charging circuit 130 produces a regulated current of approximately 700 mA at charging pole 150 when a battery is connected.

A pull-up resistor R3 is coupled between power supply terminal 110 and charging terminal 150. In a preferred embodiment, pull-up resistor R3 has a value of 100 kΩ. Pull-up resistor R3 pulls the voltage at charging terminal 150 up to 12 V when charging circuit 230 is inactive to prevent the system from oscillating.

Switch control circuit 140A detects the output voltage level $V_{out}$ by comparing it to reference voltage $V_{ref}$. By detecting the output voltage Revel $V_{out}$, logical switch control circuit 140A determines-whether a battery is connected to the charger at charging terminal 150. If no battery is connected, the output voltage level $V_{out}$ at charging terminal 150 will be the maximum,output Voltage of charging circuit 130. This high voltage level is sensed by logical switch control circuit 140A, which in response causes power control switch 120 to open in the manner described above, effectively cutting off standby current. When power control switch 120 is opened, the voltage level $V_{out}$ is pulled up to +12 VDC by pull-up resistor R3, causing power control switch 120 to remain open.

If a battery is connected to charging terminal 150, the voltage level $V_{out}$ will be pulled substantially lower than the maximum output voltage level of charging circuit 130. In response to a lowered voltage level at charging terminal 150, logical switch control circuit 140A causes power control switch 120 to close, permitting power to be applied to battery charging circuit 130.

The circuit values of resistor R1 and zener diode D1 are selected such that $V_{ref}$ is less than $V_{out}$ when no battery is attached to charging terminal 150, but exceeds $V_{out}$ whenever a battery is attached to charging terminal 150.

In one embodiment, switch control circuit 140A also includes transistor Q2 and line 255. Transistor Q2 is a conventional NPN-type transistor having base, collector and emitter terminals. The base of transistor Q2 is coupled to the VDD contact of system connector 290 via line 225. VDD is a reference voltage output that is high only when the battery powered device is on, or is otherwise connected to an active battery charger. The collector of transistor Q2 is coupled to the gate terminal 123 of switch 120, and the emitter of transistor Q2 is coupled to ground. Transistor Q2 is included to provide some redundancy to the operation of control circuit 140A. Under some charging conditions such as during trickle charging, it is possible that charging circuitry within a battery powered device could cause the voltage level at $V_{out}$ to exceed the reference voltage $V_{ref}$, which could cause the charging system 200 to turn off power to charging circuit 130. Under such circumstances, however, the high voltage level at the VDD contact causes transistor Q2 to conduct, thereby keeping switch 120 closed.

Figure 2A:
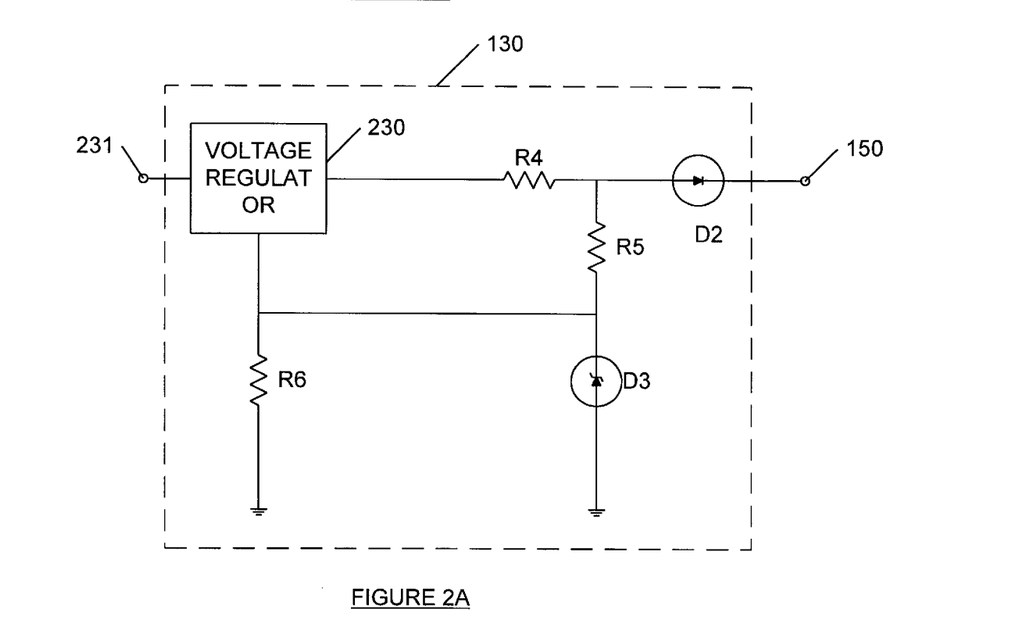
FIG. 2A is a circuit diagram of a battery charging circuit for use with the present invention.

An example of a battery charging circuit suitable for use with the present invention is illustrated in FIG. 2A. As shown in FIG. 2A, battery charging circuit 130 may include a voltage regulator 230, resistors R4, R5 and R6, and diodes D2 and D3. Voltage regulator 230 may be of the type manufactured by National Semiconductor as model number LM 317-T.

Figure 3:
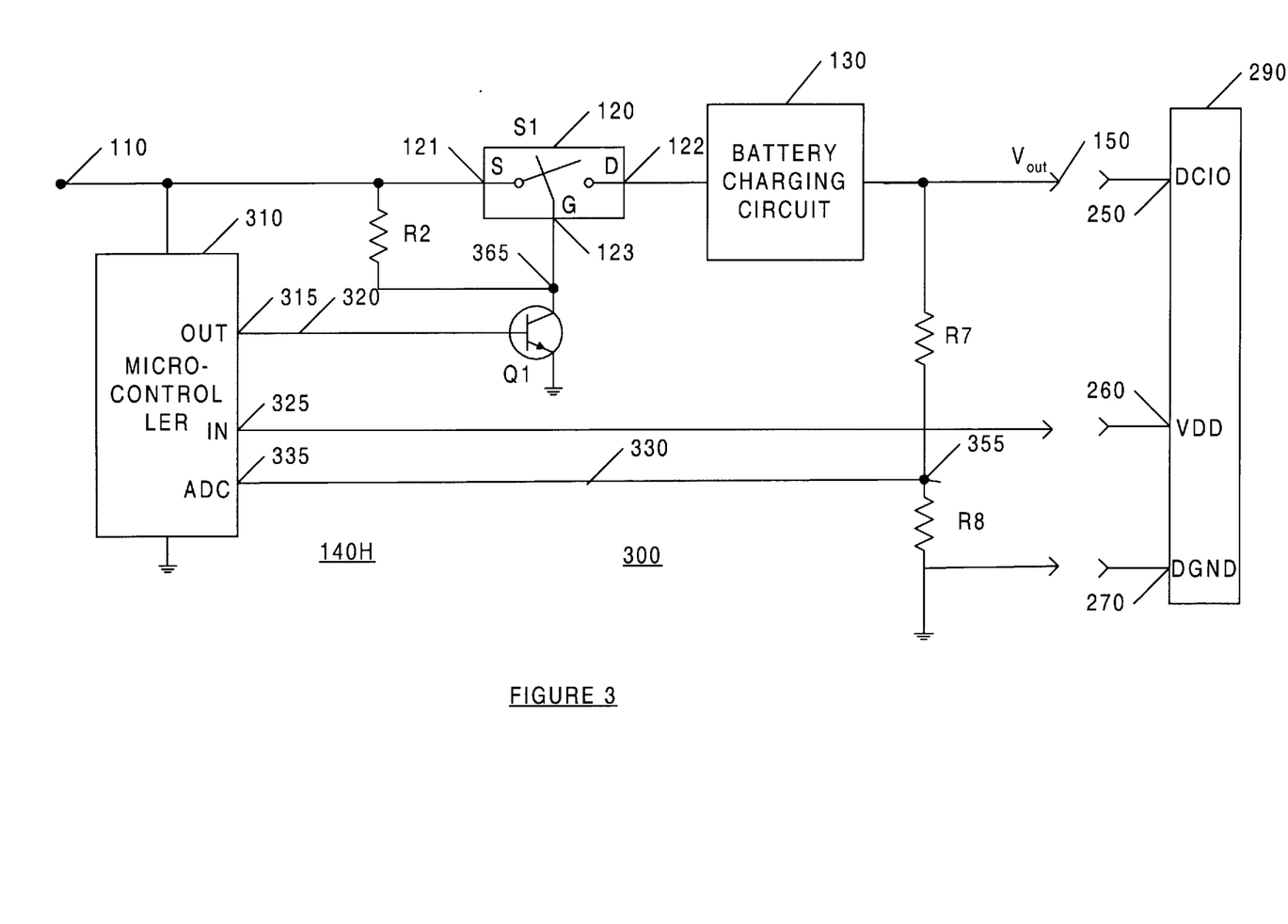
FIG. 3 is a circuit diagram of an embodiment of the present invention including a hybrid analog/digital switch control logic circuit.

In FIG. 3, an embodiment is illustrated as charging system 300 in which logical switch control means 140 is implemented as a hybrid analog/digital control circuit 140H. In the embodiment of FIG. 3, a voltage divider comprising resistors R7 and R8 defines a voltage node 355. The voltage at node 355, which is proportional to $V_{out}$, is applied to the analog-to-digital converter (ADC) input 335 of microcontroller 310, which in a preferred embodiment is part number TMP90CM36F manufactured by Toshiba. Microcontroller 310 has an output pin OUT 315, and two input pins, IN 325 and ADC 335. Microcontroller 310 continually samples the voltage at node 355 and converts the sampled voltage into a four bit digital sample. Microcontroller 310 then compares the digital sample to predetermined high and low threshold values HIGH_THRESH and LOW_THRESH, which correspond to maximum and minimum battery voltages, respectively. Microcontroller 310 controls the state of switch 120 according to the value of the digital sample and the voltage level appearing at the IN pin 325 (i.e. the value of VDD).

Figure 5:
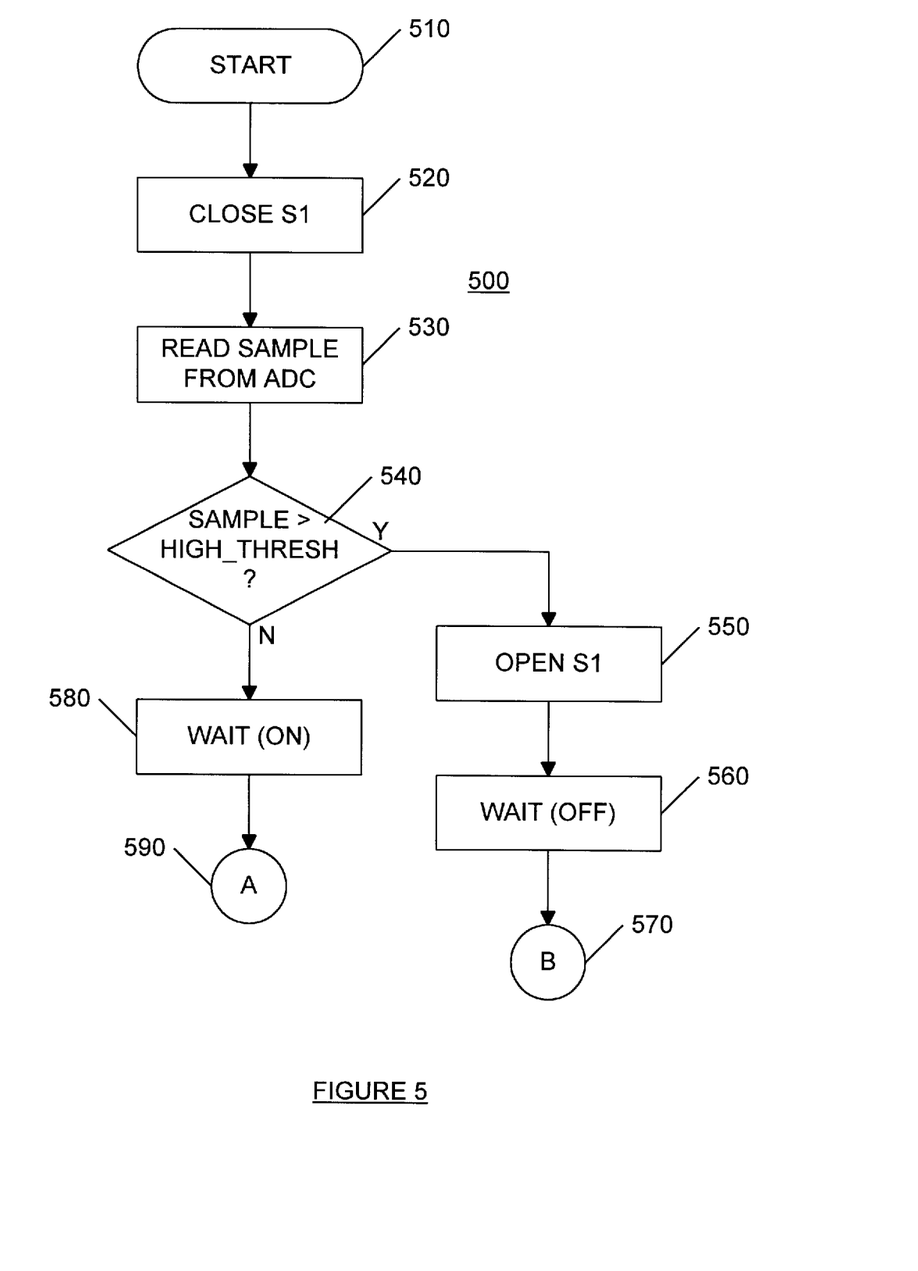
FIG. 5 is a flow diagram illustrating an aspect of the operation of the embodiment of FIG. 3.
Figure 6:
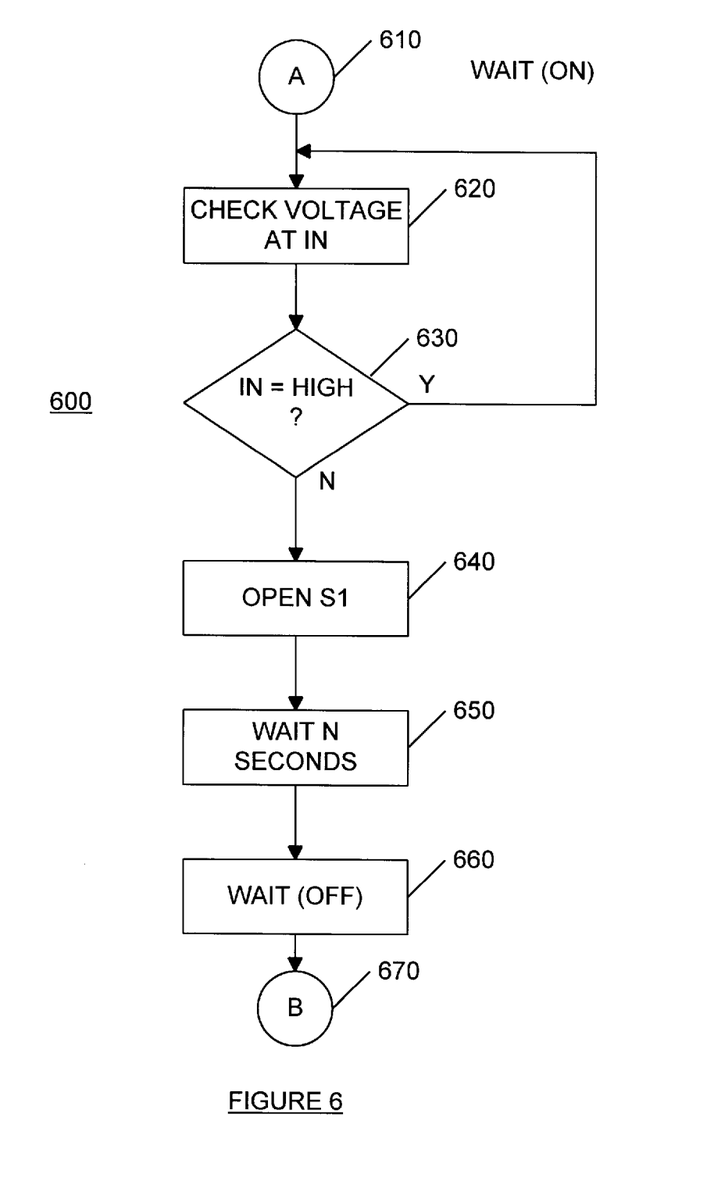
FIG. 6 is a flow diagram illustrating an aspect of the operation of the embodiment of FIG. 3.
Figure 7:
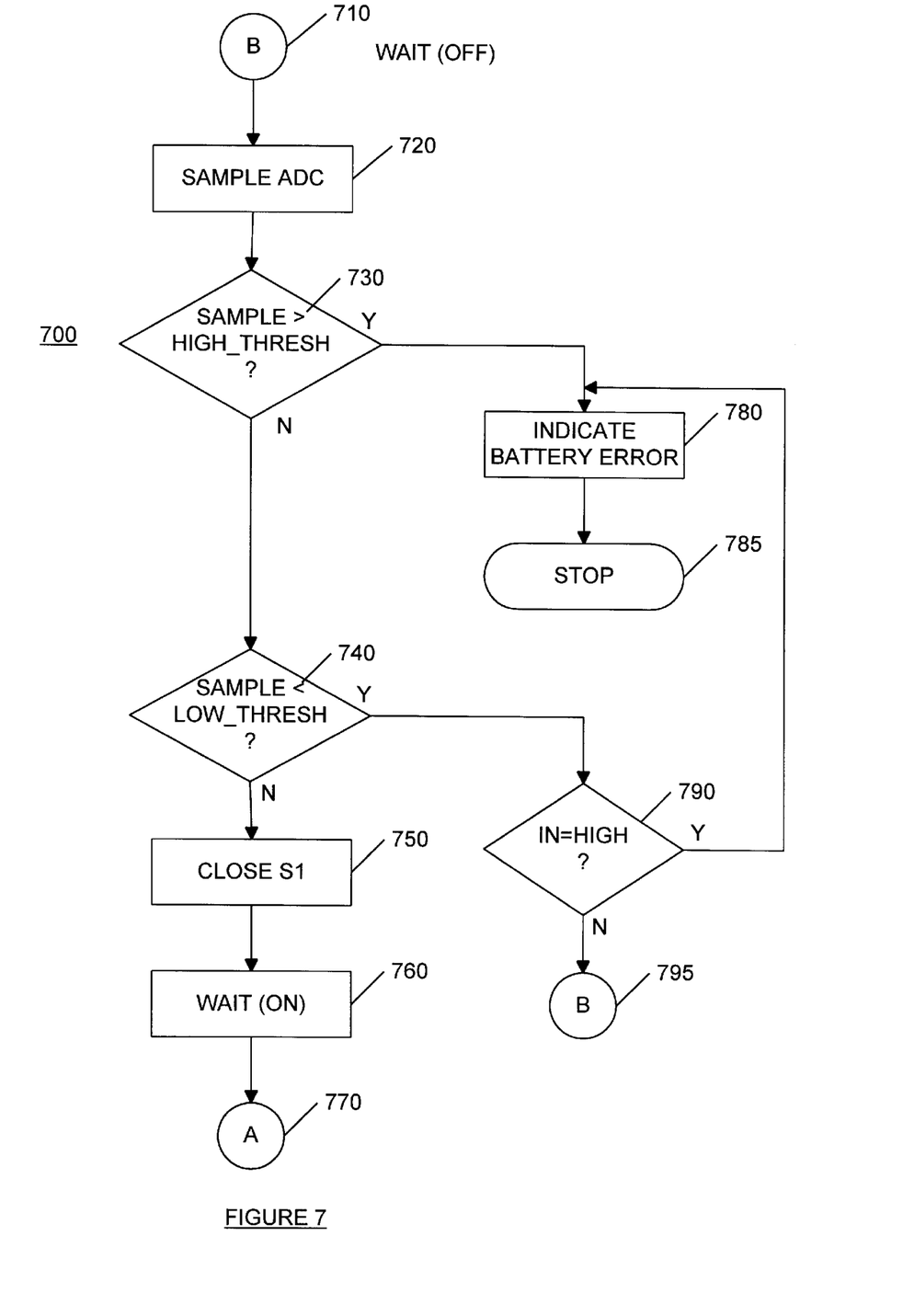
FIG. 7 is a flow diagram illustrating an aspect of the operation of the embodiment of FIG. 3.

The operation of charging system 300 is illustrated in FIGS. 5, 6 and 7. As shown in FIG. 5, when the battery charger system 300 is first powered on, microcontroller 310 closes switch 120 (step 510) and samples the voltage at node 355 (step 520). Microcontroller senses whether or not a battery powered device is connected to the system 300 by comparing the sampled voltage at node 355 to the high threshold (step 530). If the sampled voltage exceeds the high threshold, then no battery is connected, and microcontroller 310 opens switch 120 (step 550), causing the voltage level $V_{out}$ to fall to zero volts. Microcontroller 310 then enters the WAIT(OFF) state (step 560), in which the charging circuit 130 is switched off and the microcontroller 310 is waiting for further input. If the sample is less then or equal to the high threshold, then microcontroller 310 enters the WAIT (ON) state (step 580).

The operation of charging system 300 when microcontroller 310 is in the WAIT(ON) state is illustrated in FIG. 6. In the WAIT(ON) state, microcontroller 310 periodically checks the voltage level at the IN terminal 325 (steps 620, 630). If the battery is removed while the microcontroller is in the WAIT(ON) state, the voltage $V_{out}$ will rise to the maximum output voltage of charging circuit 130, and the voltage level sensed at the IN terminal 325 of microcontroller 310 will fall to zero. In response to a low voltage at the IN terminal 325, microcontroller 310 outputs a low voltage signal on control line 320, causing power control switch 120 to open (step 640). The voltage $V_{out}$ will then fall to zero volts over a finite period of time. Microcontroller 310 waits for a sufficient period of time while the voltage level $V_{out}$ settles to zero (step 650), and then enters the WAIT (OFF) state (step 660). Microcontroller 310 will not interpret this voltage drop to mean that a battery has been connected to the charging system 300, since microcontroller 310 waits before entering the WAIT(OFF) state, where the voltage level at ADC 335 will be sampled.

The operation of charging system 300 when microcontroller 310 is in the WAIT(OFF) state is illustrated in FIG. 7. If a battery powered device is connected to the charger system 300 while microcontroller 310 is in the WAIT(OFF) state, the voltage $V_{out}$ appearing at charging terminal 150 will rise to a voltage level somewhere between the maximum and minimum battery voltage levels (corresponding to the high and low threshold levels, respectively). While in the WAIT(OFF) state, the microcontroller 310 periodically samples the voltage at the ADC terminal 335 (step 720). The sample is first compared to the high threshold value (step 730). If the sample is higher than the high threshold value, microcontroller 310 indicates a battery error (step 780), since the voltage at terminal 150 should not rise above the maximum battery voltage when the charging circuit 130 is switched off. This indication may be done through a software interrupt which outputs a signal over the user interface (not shown) of the charger system 300.

If the sample is lower than the high threshold value, the sample is then compared to the low threshold value (step 740). If the sample is greater than or equal to the low threshold value, then microcontroller 310 causes switch 120 to close (step 750), and places itself into WAIT(ON) state (step 770). If the sample is less than the low threshold value, then microcontroller 450 checks the voltage level at the IN terminal 325 (step 790). If the voltage level at the IN terminal 325 is high, then a battery error is indicated (step 780), since the voltage at the VDD terminal should not be high if the voltage at terminal 150 is lower than the minimum battery voltage. In response to an error indication, the microcontroller 450 opens switch 120 and enters an idle state. If the voltage level at the IN terminal 325 is low, then microcontroller 310 resumes the WAIT(OFF) state (step 795).

Figure 4:
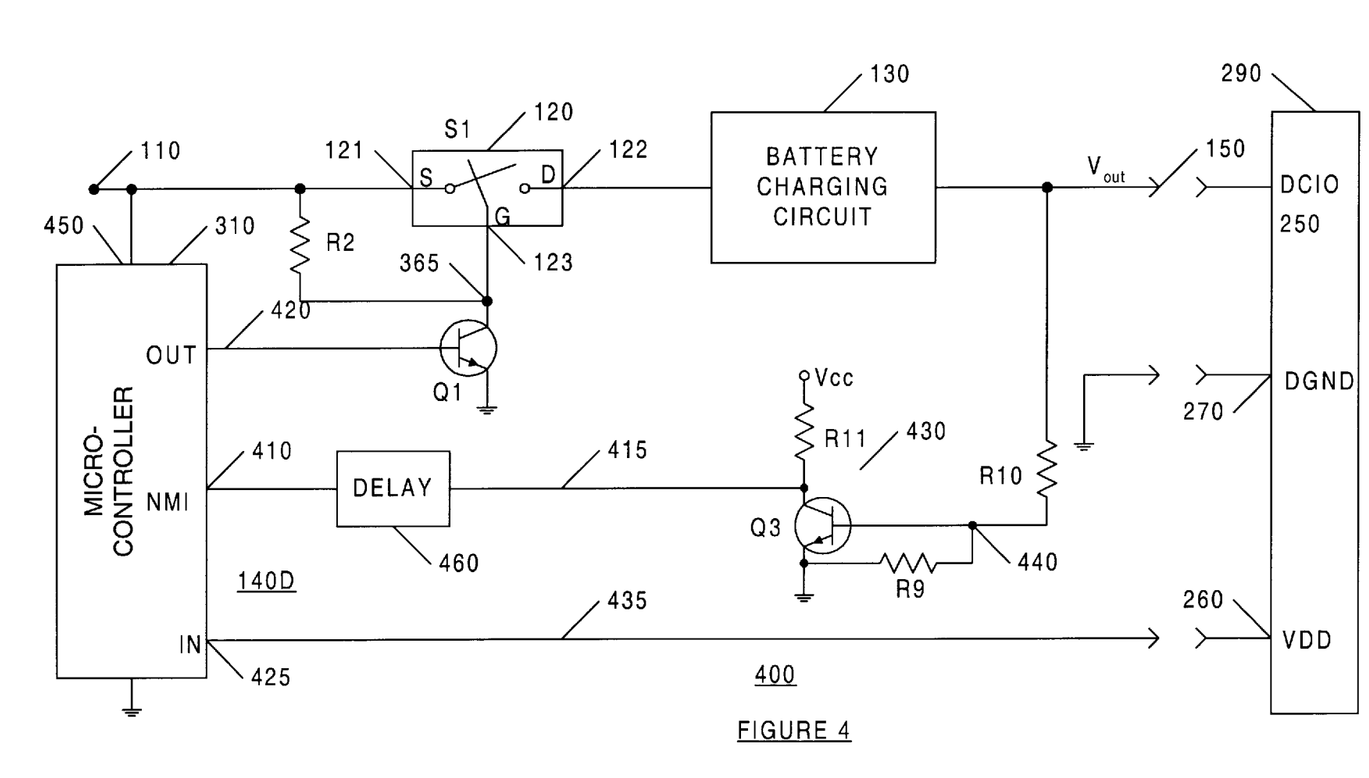
FIG. 4 is a circuit diagram of an embodiment of the present invention including a digital switch control logic circuit.

FIG. 4 shows a battery charging system 400 in which switch control circuit 140D uses a digital feedback signal to control power control switch 120. The voltage $V_{out}$ appearing at charging pole 150 is divided down by means of voltage divider resistors R10 and R9. The divided voltage appearing at node 440 is fed directly into an inverter 430. The output of inverter 430 is passed through a delay circuit 460 to terminal 410 on microcontroller 450 via line 415. In a preferred embodiment, microcontroller 450 is part number TMP90CM36F manufactured by Toshiba. Delay circuit 460, which in a preferred embodiment is a conventional Schmitt Trigger circuit, is provided so that momentary disconnections of the battery (not shown) from the charger 400 (such as may occur if the handsfree unit is accidentally bumped, for example) will not cause the charging circuit 130 to be powered off, and so that high-to-low voltage transitions seen at terminal 410 will be sharp transitions. When the voltage at node 440 (which is proportional to $V_{out}$) is sufficiently high, inverter 430 will output a low voltage signal to microcontroller 450 on line 415. When the voltage at node 440 drops below a predetermined level, inverter 440 will output a high voltage signal to microcontroller 450 on line 415. When the voltage appearing at terminal 410 transitions from high to low, a non-maskable interrupt is triggered in microcontroller 450. In response to the interrupt, microcontroller 450 sets the voltage on control line 420 high to close power control switch 120.

Figure 8:
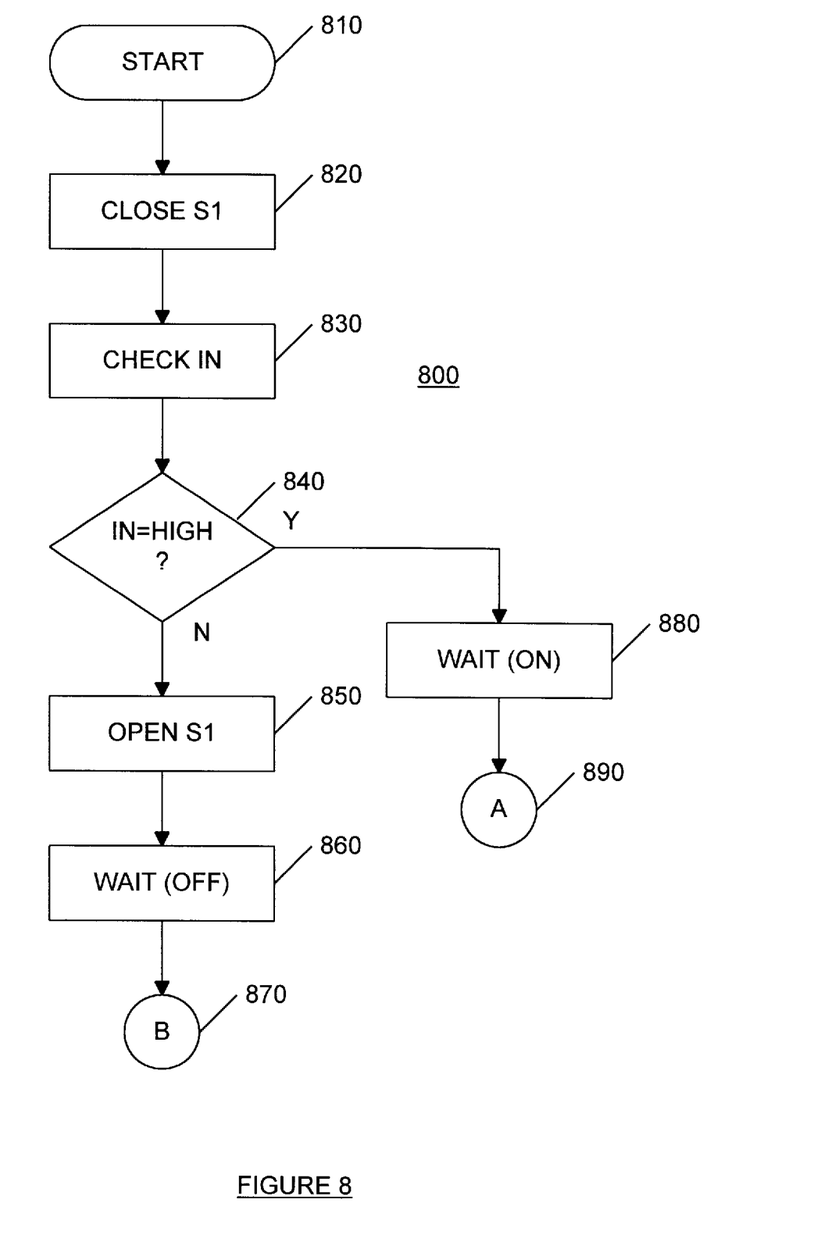
FIG. 8 is a flow diagram illustrating an aspect of the operation of the embodiment of FIG. 4.
Figure 9:
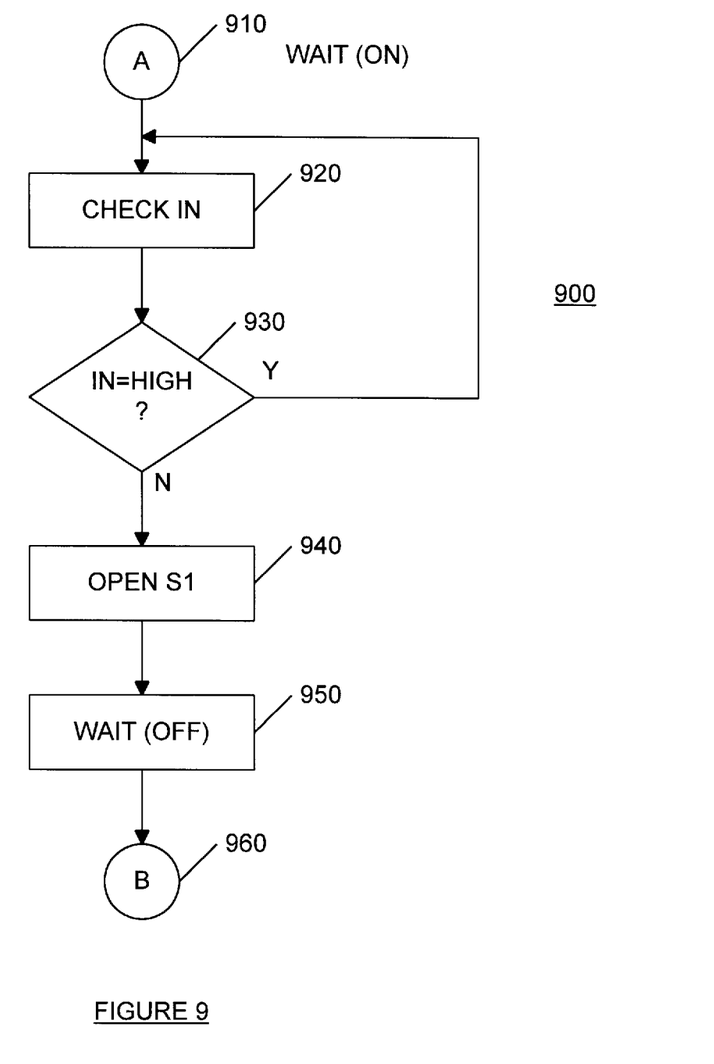
FIG. 9 is a flow diagram illustrating an aspect of the operation of the embodiment of FIG. 4.
Figure 10:
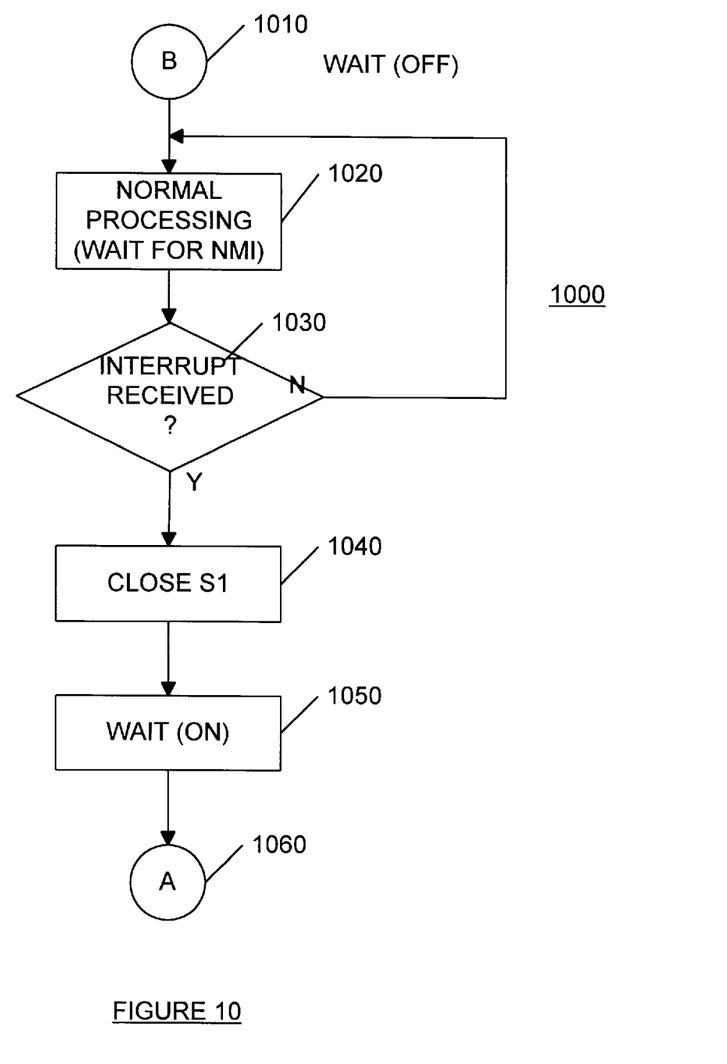
FIG. 10 is a flow diagram illustrating an aspect of the operation of the embodiment of FIG. 4.

The operation of charging system 400 is illustrated in FIGS. 8, 9 and 10. Referring to FIG. 8, when system 400 is initially powered on, microcontroller 450 sets the voltage on control line 420 high, causing power control switch 120 to close (step 820), and powering on charging circuit 130. If a suitable battery powered device is connected to charging system 400, the battery powered device will detect the presence of a charger and raise the voltage on the VDD terminal to a high voltage level. Microcontroller 450 then checks the voltage level at the IN terminal 425 (which corresponds to the voltage level at VDD) (step 830). If the voltage level at the IN terminal is high, then microcontroller 310 enters the WAIT(ON) state (step 880). If the voltage level at the IN terminal is low, then microcontroller opens switch 120 (step 850) and enters the WAIT(OFF) state.

The operation of the WAIT(ON) state for charging circuit 400 is illustrated in FIG. 9. In the WAIT(ON) state, microcontroller 450 periodically checks the voltage level at the IN terminal 425 (steps 920, 930). When the battery powered device is removed from the battery charger 400, the voltage appearing at IN terminal 425 transitions from high to low. When this transition is detected, microcontroller 450 causes power control switch 120 to open (step 940). Microcontroller 450 then enters the WAIT(OFF) state.

The operation of the WAIT(OFF) state for charging circuit 400 is illustrated in FIG. 10. Microcontroller 450 continues normal processing while in the WAIT(OFF) state until a non-maskable interrupt is detected (step 1030) due to a high-to-low transition at NMI terminal 410. If a battery powered device having a non-defective battery is attached to the battery charging system 400 while microcontroller 450 is in the WAIT(OFF) state, the voltage appearing at node 440 will cause transistor Q3 to conduct. When transistor Q3 turns on, the output of inverter 430 transitions from high to low. This transition is propagated through delay circuit 460 to NMI terminal 410 of microcontroller 450, which triggers a non-maskable interrupt. Upon the occurrence of such an interrupt, microcontroller 450 causes switch 120 to close (step 1040) and enters the WAIT(ON) state(step 1050).

In yet another embodiment, logical switch control means 140 and power control switch means 120 comprise a mechanical switch such as a microswitch, the design and operation of which are well known to those skilled in the art. The mechanical switch acts to physically close the power control switch 120 when a battery is placed in the charger and open the power control switch when the battery is removed. Thus, when no battery is present in the charger, no standby current will be drawn.

While the present invention has been described with respect to its preferred embodiment, those skilled in the art will recognize that the present invention is not limited to the specific embodiment described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention.

What is claimed is:

1. An apparatus for charging a battery, comprising:
   a power supply terminal;
   a controllable power control switch coupled to said power supply terminal;
   a charging circuit coupled to said power control switch, said charging circuit having a charging terminal for connection to a terminal of the battery; and
   control means, coupled to said power control switch, for detecting the presence of a battery connected to the charging terminal and for opening said power control switch if no battery is connected to the charging terminal.

2. The apparatus of claim 1, further comprising means for closing said power control switch if a battery is connected to the charging terminal.

3. The apparatus of claim 1, wherein said control means comprises a comparator coupled to said power control switch for comparing a voltage level of the charging terminal with a reference voltage level.

4. The apparatus of claim 3, further including means for generating the reference voltage level.

5. The apparatus of claim 3, further comprising a pull-up resistor Coupled between said power supply terminal and said charging terminal.

6. The apparatus of claim 3, further comprising means for maintaining said power control switch in a closed position if a battery is connected to said charging terminal and the voltage level of the charging terminal rises above the reference voltage level.

7. The apparatus of claim 4, wherein said means for generating the reference voltage level comprises a zener diode.

8. The apparatus of claim 1, wherein said control means comprises means for generating a voltage signal proportional to the voltage at the charging terminal, means for converting said proportional voltage signal to a digital value, and means for comparing said digital value to a first predetermined threshold value.

9. The apparatus of claim 8, wherein said control means further comprises means for opening said power control switch if said digital value exceeds the first predetermined threshold value.

10. The apparatus of claim 8, further comprising means for closing said power control switch if a battery is connected to the charging terminal.

11. The apparatus of claim 10, wherein said means for closing said power control switch further comprises means for closing said power control switch if said digital value is less than the first predetermined threshold value.

12. The apparatus of claim 2, wherein said means for closing the power control switch comprises means for generating a voltage signal proportional to the voltage at the charging terminal, signal detection means for detecting the proportional signal to generate a logical signal, and a microprocessor for receiving the logical signal and for closing said power control switch when the logical signal transitions from a first state to a second state.

13. The apparatus of claim 12, further comprising means for opening the power control switch if no battery is connected to the charging terminal.

14. The apparatus of claim 13, further comprising a delay circuit coupled between said signal detection means and said microprocessor.

15. A method of sensing the presence of a battery connected to a battery charging system having a charging terminal for connection to a terminal of the battery, comprising the steps of:
   generating a reference voltage level;
   sensing the voltage level at the charging terminal; and
   comparing the voltage level at the charging terminal to the reference voltage.

16. A method of controlling a power control switch of a battery charging system having a charging terminal for connection to a terminal of the battery, comprising the steps of:
   generating a reference voltage level;
   sensing the voltage level at the charging terminal;
   comparing the voltage level at the charging terminal to the reference voltage;
   closing said power control switch if the reference voltage level exceeds the voltage level at the charging terminal; and
   opening said power control switch if the voltage level at the charging terminal exceeds the reference voltage level.

17. A method of controlling a power control switch of a battery charging system having a charging terminal for connection to a terminal of the battery and an input terminal for connection to a voltage supply reference terminal of a battery powered device housing the battery, the method comprising the steps of:

closing the power control switch;

sensing the voltage level at the charging terminal;

comparing the voltage level at the charging terminal to a first predetermined threshold value; and    opening said power control switch if the voltage level at the charging terminal exceeds the first predetermined threshold value or if the voltage appearing at the input terminal is low.

18. The method of claim 17, wherein the step of sensing the voltage level at the charging terminal includes the steps of:

generating a voltage proportional to the voltage level at the charging terminal; and    converting the proportional voltage into a digital value.

19. A method of controlling a power control switch of a battery charging system having a charging terminal for connection to a terminal of the battery and an input terminal for connection to a voltage supply reference terminal of a battery powered device housing the battery, the method comprising the steps of:

opening the power control switch;

sensing the voltage level at the charging terminal;

comparing the voltage level at the charging terminal to a first predetermined threshold value;

if the voltage level at the charging terminal does not exceed the first predetermined threshold value, comparing the voltage level at the charging terminal to a second predetermined threshold value; and    if the voltage level at the charging terminal exceeds or is equal to the first predetermined threshold value, closing the power control switch.

20. The method of claim 19, wherein the step of sensing the voltage level at the charging terminal includes the steps of:

generating a voltage proportional to the voltage level at the charging terminal; and    converting the proportional voltage into a digital value.

21. The method of claim 19, further including the step of waiting a predetermined period of time after opening the power control switch prior to sensing the voltage level at the charging terminal.

22. The method of claim 19, further including the step of indicating a battery error if the voltage at the charging terminal exceeds the first predetermined threshold value.

23. The method of claim 19, further including the step of indicating a battery error if the voltage at the charging terminal is less than the second predetermined threshold value and the voltage appearing at the input terminal is high.

* * * * *